(12) United States Patent
Adachi (10) Patent No.: US 6,975,931 B2
(45) Date of Patent: Dec. 13, 2005

(54) AUTOMATIC VEHICLE SPEED CONTROL APPARATUS

(75) Inventor: Hidefumi Adachi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/421,859

(22) Filed: Apr. 24, 2003

(65) Prior Publication Data

US 2003/0204300 A1  Oct. 30, 2003

(30) Foreign Application Priority Data

Apr. 25, 2002 (JP) .............................. 2002-123337

(51) Int. Cl.[7] .............................................. G06F 7/00
(52) U.S. Cl. ...................... 701/96; 701/301; 180/170; 180/167; 123/352
(58) Field of Search ............................ 701/96, 301, 93, 701/54, 51; 180/170, 169; 340/903, 435

(56) References Cited

U.S. PATENT DOCUMENTS 6,076,622 A * 6/2000 Chakraborty et al. ....... 180/169
6,116,369 A * 9/2000 King et al. .................. 180/169
6,370,470 B1 * 4/2002 Yamamura et al. ........... 701/96
6,496,770 B2 * 12/2002 Winner et al. ................ 701/96
6,789,009 B2 * 9/2004 Schmitz et al. ............... 701/93

FOREIGN PATENT DOCUMENTS

JP  7-200991  8/1995
JP  8-192662  7/1996

* cited by examiner

Primary Examiner—Thomas G. Black
Assistant Examiner—Christine M. Behncke
(74) Attorney, Agent, or Firm—Crowell & Moring LLP (57) ABSTRACT

A cruise control capable of maintaining the speed of a vehicle at a set cruise speed is selected when the headway distance to a preceding vehicle is equal to or greater than a set distance. Headway distance control, maintaining the headway distance to the preceding vehicle at a required value, is selected when the headway distance is smaller than a set distance. Fleet driving, in which the vehicle runs at the same set speed as that of the preceding vehicle, is enabled by increasing the vehicle speed upper limit existing under the headway distance control above a set cruise speed.

15 Claims, 9 Drawing Sheets

AUTOMATIC VEHICLE SPEED CONTROL APPARATUS

BACKGROUND OF THE INVENTION

The present invention relates to an automatic vehicle speed control apparatus to conduct constant speed driving control when the headway distance to the preceding vehicle is equal to, or greater than a set value, and to conduct headway distance control when the headway distance is smaller than the set value, and more particularly to follow-up driving under the headway distance control.

The vehicles with (ACC) as an option are coming to be marketed in order to achieve driving comfort. The adaptive cruise control recognizes the behavior of the preceding vehicle by means of a laser radar or a millimeter radar and hereby implement automatic follow-up driving. when the headway distance is equal to, or greater than a set value, the own vehicle can run at a constant speed. When once the own vehicle has overtaken the preceding vehicle, the own vehicle can automatically run to maintain the set headway distance, Additionally, Vehicle control with steering wheel control, inter-vehicle communications, road-to-vehicle communications, and other factors added to ACC in order to achieve fleet driving (driving in line) on expressways or automobile-dedicated roads and hereby to improve traffic efficiency and reduce drivers' burdens, is also proposed.

The above control system is disclosed in, for example, Japanese laid-open patent publications Nos. Hei 07-200991 and Hei 08-192662.

SUMMARY OF THE INVENTION

Under these circumstances, the heavy-duty trucks that will be newly registered from September 2003 are obliged to be equipped with a 90-km/h speed limiting device in order to reduce accidents on expressways. This will increase the demand for the execution of fleet driving on expressways.

To consider up to the collaborative control that uses inter-vehicle communications and/or road-to-vehicle communications, however, the unification of standards is first required. Therefore, it is difficult, for the moment, to apply such fleet driving to general vehicles.

The Japanese laid-open patent publication No. Hei 07-200991 relates to a case in which the collaborative control using inter-vehicle communications is to be realized. Although fleet driving With ACC is possible, even if the same vehicle speed is set for a fleet, follow-up driving is not always possible because of idiosyncrasies in speed recognition between vehicles. Particularly, fleet driving at the ACC-settable maximum speed is difficult.

Although the conventional ACC described in Japanese laid-open patent publication No. Hei 08-192662 is improved so as to enable follow-up with the preceding vehicle when its actual speed is increased above the set speed, fleet driving is not considered and therefore the set vehicle speed is limited to the value existing during the start of vehicle speed control. Accordingly, it is not always possible for following vehicles to follow the preceding vehicle when the same vehicle speed is set.

An object of the present invention is to provide an automatic vehicle speed control apparatus by which, when the preceding vehicle is running within legal speed limits, all vehicles following the preceding vehicle can continue to run in line (fleet driving) and highly efficient and smooth flow of traffic and reduction in drivers' burdens can be achieved.

The above object can be fulfilled by increasing the upper-limit value of the vehicle speed placed under the control of the headway distance, to a value moderately greater than the vehicle speed which is set beforehand.

DETAILED DESCRIPTION OF THE PREFERRED EMBODIMENTS

Figure 1:
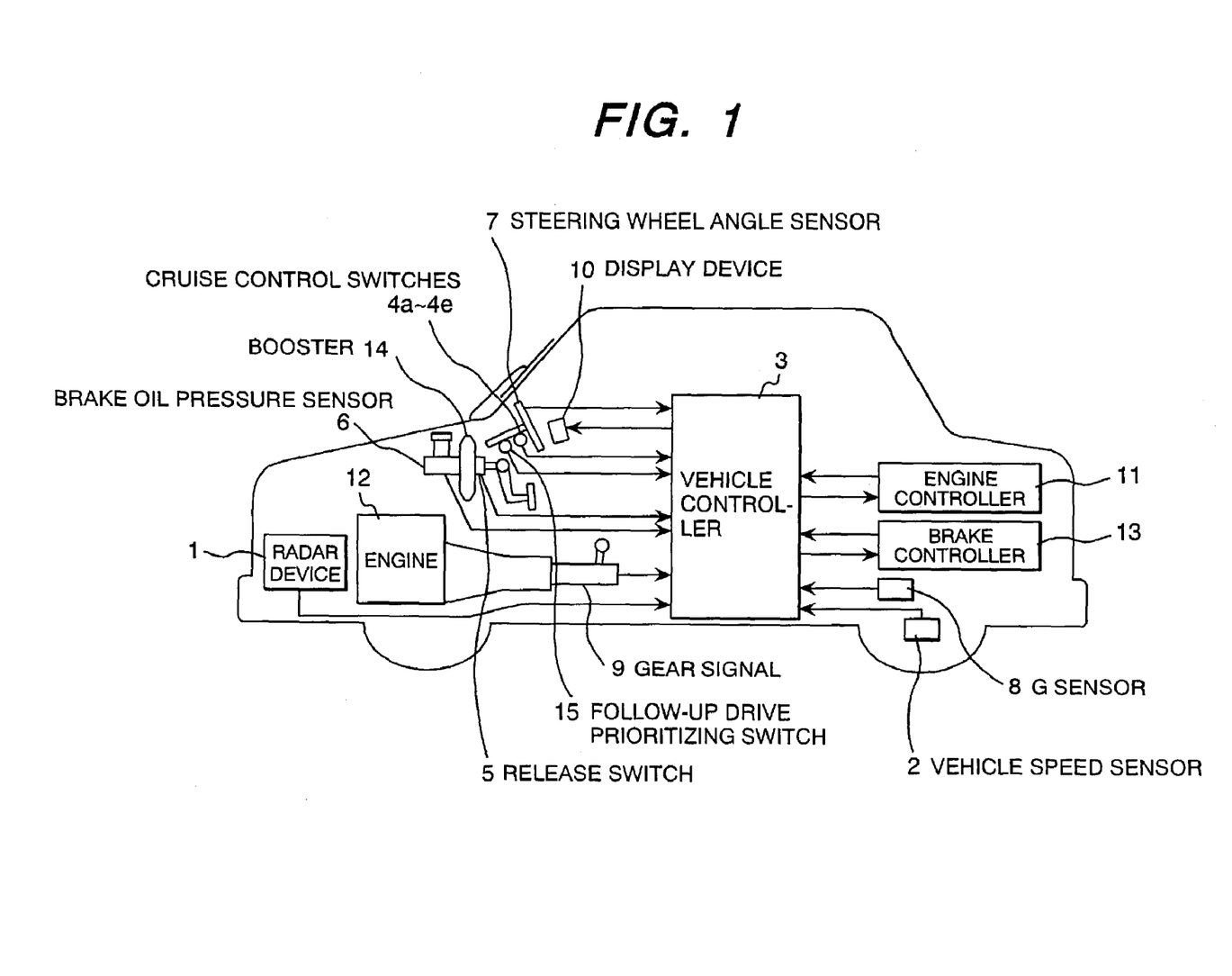
FIG. 1 is a system block diagram showing an embodiment of the present invention.

The preferred embodiments of the present invention are described below using drawings. An example of a system block diagram of the automatic vehicle speed control apparatus pertaining to the invention is shown in FIG. 1. This automatic vehicle speed control apparatus is constructed so that the behavior of the preceding vehicle is recognized by a radar device 1, and then the recognized behavior is checked against the information sent from a vehicle speed sensor 2. The own vehicle runs at a constant speed when the headway distance is equal to, or greater than, the set value, and automatically follows the preceding vehicle at the set headway distance once the former has overtaken the latter.

Vehicle controller 3 is the main controller for providing automatic speed control. The other inputs required for control include a main switch 4a for making the automatic speed control function valid and invalid, a setting switch 4b for setting the vehicle speed for constant-speed driving, a resuming switch 4c for resuming control after it has been canceled, a cancellation switch 4d for temporary cancellation, a tap switch 4e for setting the headway time against the preceding vehicle, a release switch 5 that operates only during the braking operations of the driver and does not operate during automatic braking, a brake oil pressure sensor 6 that detects applied braking force, a steering wheel angle sensor 7 that detects corner driving, a G-sensor 8, a gear signal device 9 for detecting transmission gear status, and so on.

The set vehicle speed and control status are transmitted to the driver via a display device 10. The display device 10 here can include a voice function in addition to screen display. When a voice function is included, eyes-free operations are realized, which is preferable in terms of safe driving.

Target commands from the vehicle controller 3 activate an engine controller 11 to control the opening angle of a throttle (not shown in the figure), with the result that the amount of inlet air to an engine 12 and even the output thereof are adjusted. Also, a brake controller 13 controls a booster 14 or a hydraulic actuator (not shown in the figure), hereby adjusting a brake oil pressure sensor 6. Finally, automatic speed control is provided by headway distance feedback control.

Follow-up drive prioritizing switch 15 is a switch by which, although normal ACC mode is valid during the OFF status of the switch, an ACC mode that assigns priority to follow-up driving will be selected when the switch is set to the ON position.

Figure 2:
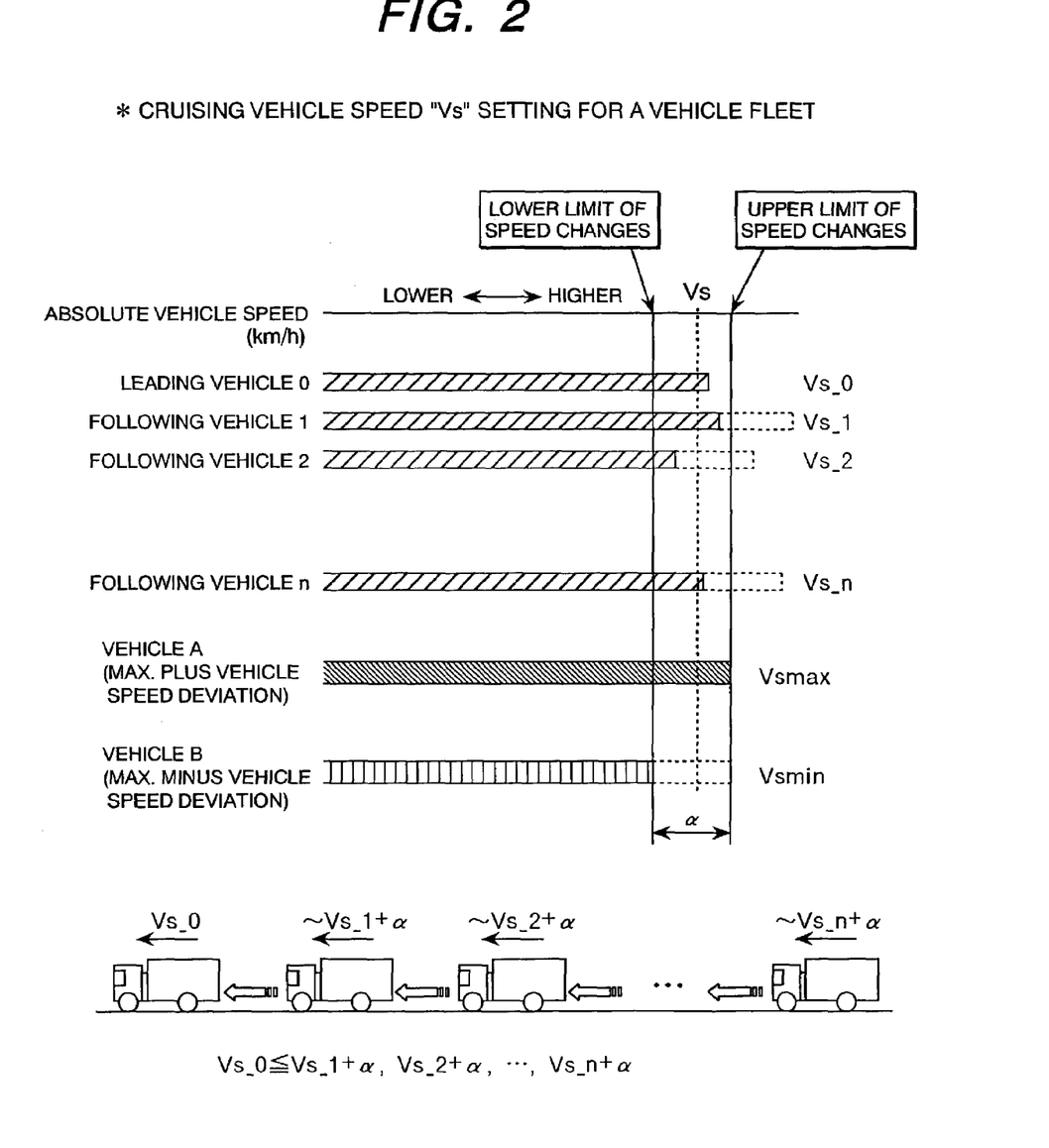
FIG. 2 is a diagram explaining the principles of operation.

FIG. 2 is a diagram explaining the principles of operation.

More specifically, FIG. 2 shows a status in which any vehicle speed "Vs" is set for one entire fleet of vehicles which are to be driven in line (fleet driving). In normal ACC mode, since the set vehicle speed is controlled as an upper-limit vehicle speed during headway distance control, if the value of "Vs" when viewed in terms of absolute speed does not change between vehicles, fleet driving will be possible, but realistically, this is not probable.

To follow the preceding vehicle, the own vehicle must be driven at a speed equal to, or higher than, that of the preceding vehicle. Even when the vehicle speed "Vs" is set for each vehicle, however, the actual speeds of individual vehicles when compared in absolute speed will differ ("Vs_0", "Vs_1", "Vs_2", . . . "Vs_n") as shown in the figure. Fleet driving is established, only when the set speeds "Vs_1", "Vs_2", . . . "Vs_n" of the following vehicles are all equal to, or greater than, the set speed "Vs_0" of the preceding vehicle.

In this figure, since the set speed "Vs_1" of the following vehicle 1 is greater than the set speed "Vs_0" of the leading vehicle 0, follow-up in this zone is established, whereas, since the set speed "Vs_2" of the following vehicle 2 is smaller than the set speed "Vs_1" of the following vehicle 1, the following vehicle 2 cannot follow the vehicle 2 in this zone and fleet driving is disturbed.

Let us here consider the upper and lower limits of speed changes when viewed in terms of absolute vehicle speed. If the difference between these upper and lower limits is taken as "α", it is possible, by changing the upper-limit vehicle speed of all following vehicles placed under headway distance control, from the set speed "Vs" to a value of "Vs+α" or more, to make the following vehicles run at a speed higher than that of the leading vehicle 0, since the vehicle speed in the form of fleet driving matches the set speed ("Vsmax" or less) of the leading vehicle 0, and thereby to make fleet driving possible since the differences in vehicle speed between vehicles can be absorbed.

Of course, it suffices just to set the upper-limit vehicle speed in headway distance control mode so that the differences in vehicle speed between vehicles are greater than the set speed, and the method of setting the upper-limit vehicle speed does not need to be limited to fixed-value addition described earlier in this Specification.

FIGS. 3 to 9 are flowcharts showing examples of control.

Figure 3:
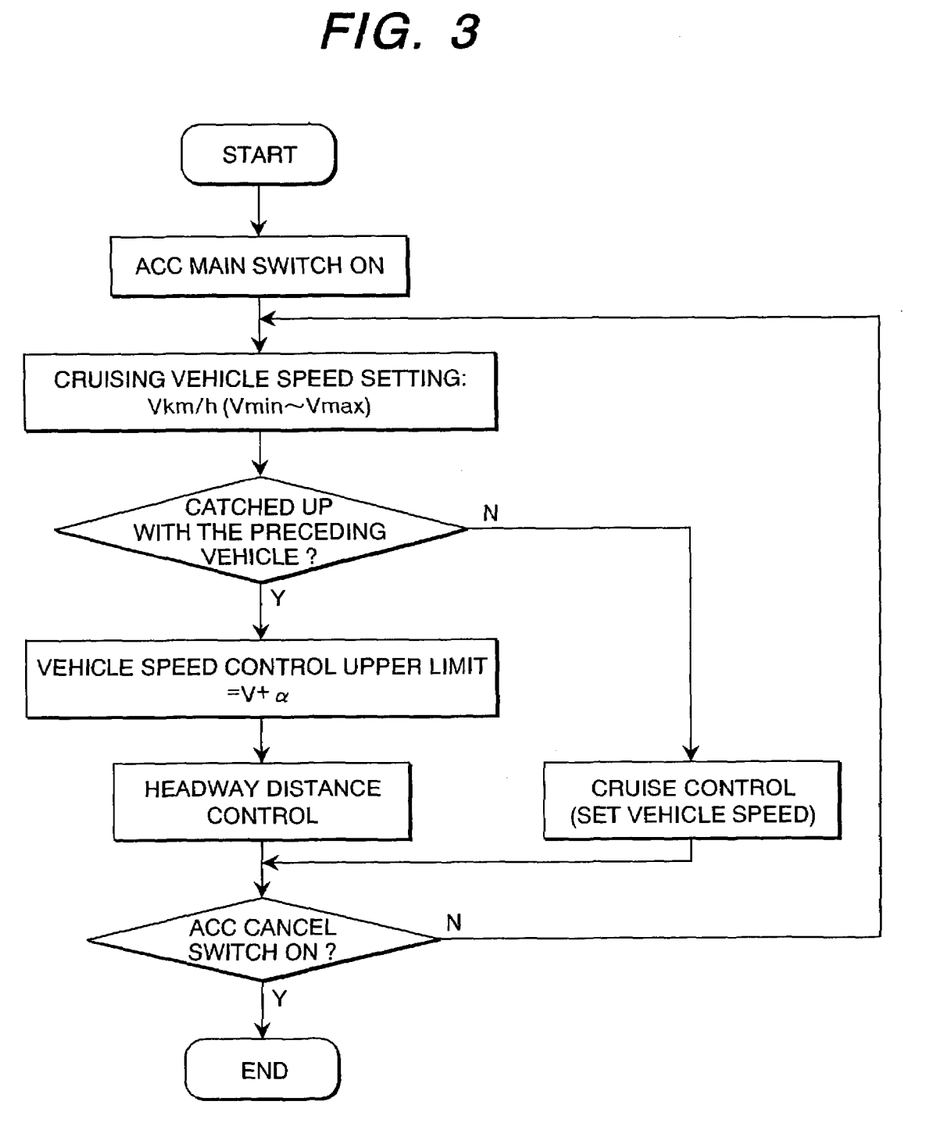
FIG. 3 is a control flowchart showing an embodiment of the present invention.

FIG. 3 is a flowchart showing an example in which the upper-limit vehicle speed during headway distance control is greater than the set value by a fixed speed, and this flowchart also corresponds to FIG. 2 explaining the principles of operation.

Figure 4:
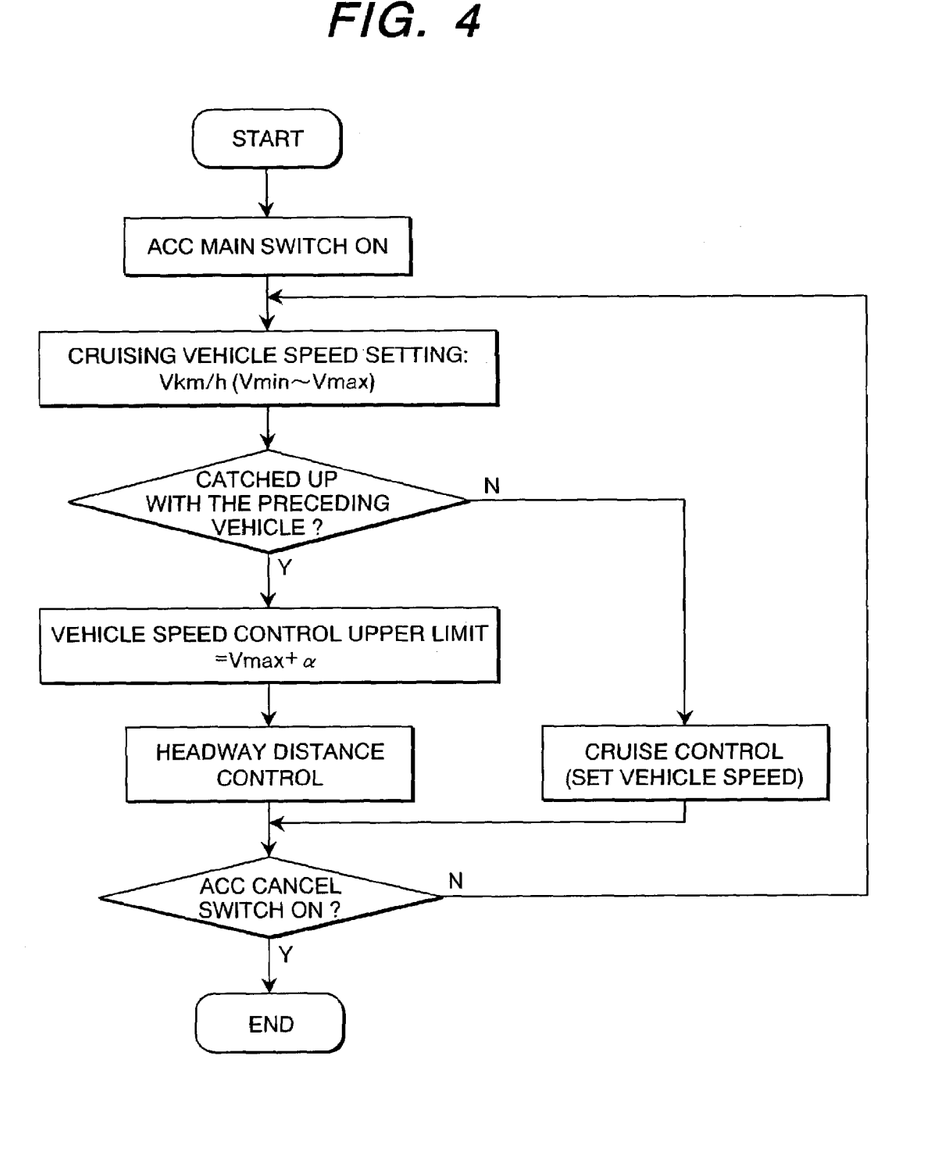
FIG. 4 is a control flowchart showing another embodiment of the present invention.

FIG. 4 is a flowchart showing an example in which the upper-limit vehicle speed during headway distance control is set to a fixed value which is greater than the upper limit of the vehicle speed setting range by a fixed speed. Although the response of the following vehicle is improved by using this method, the use thereof is limited to driving on expressways, since the vehicle automatically follows once the preceding vehicle has accelerated to the upper limit of the vehicle speed setting range.

Although no such information is shown in the flowchart, the map information supplied by a car navigation system or the information supplied by an automatic expressway charge collection system, or other information may be usable as an expressway identification means.

Figure 5:
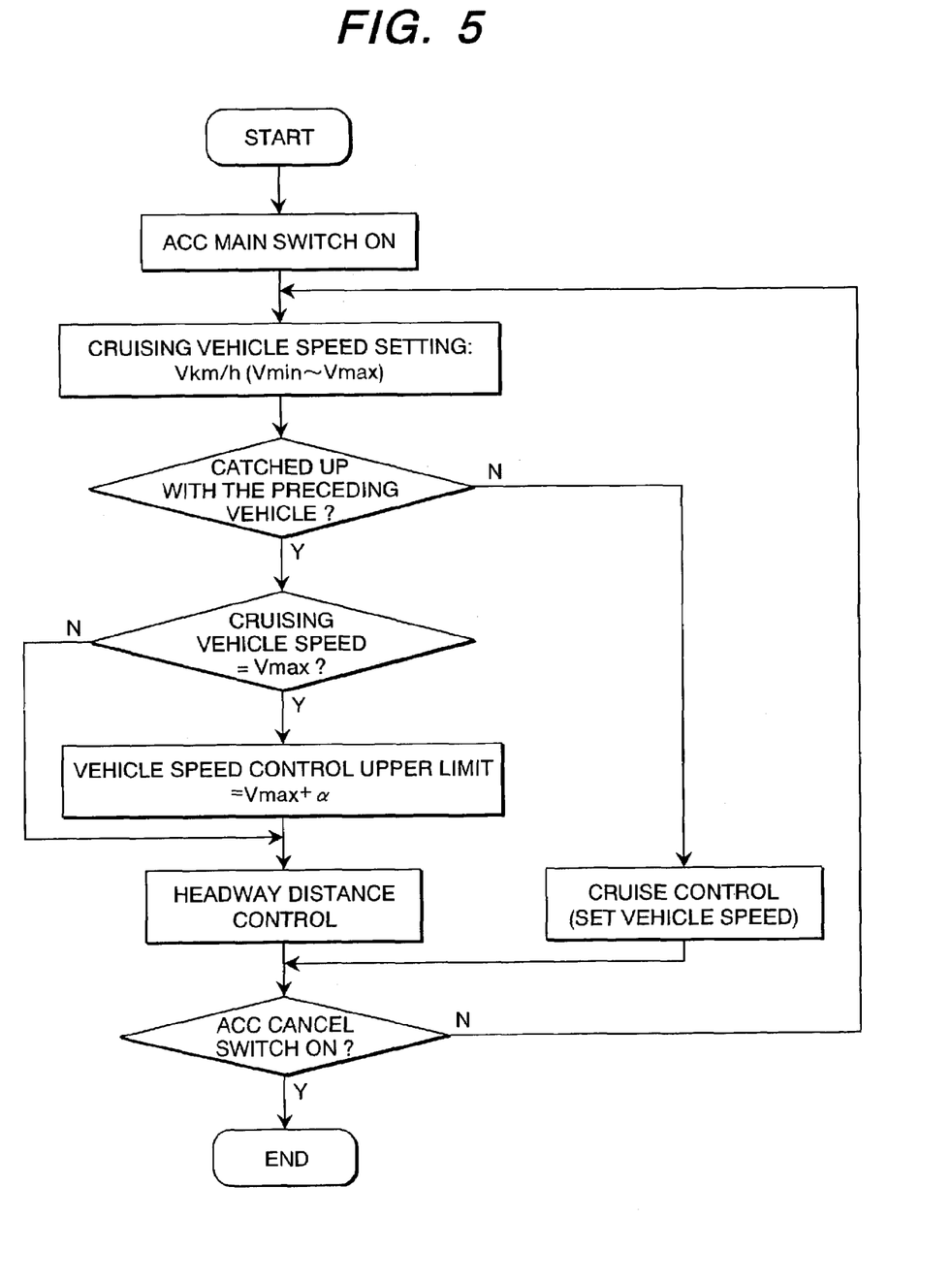
FIG. 5 is a control flowchart showing a yet another embodiment of the present invention.

FIG. 5 shows an example in which, when the vehicle speed is set to the upper limit, the upper-limit vehicle speed during headway distance control matches a value greater than the upper limit of the vehicle speed setting range by a fixed speed. The adoption of this configuration makes it possible to reduce the uncomfortable feeling of the driver familiar with a conventional ACC system.

Figure 6:
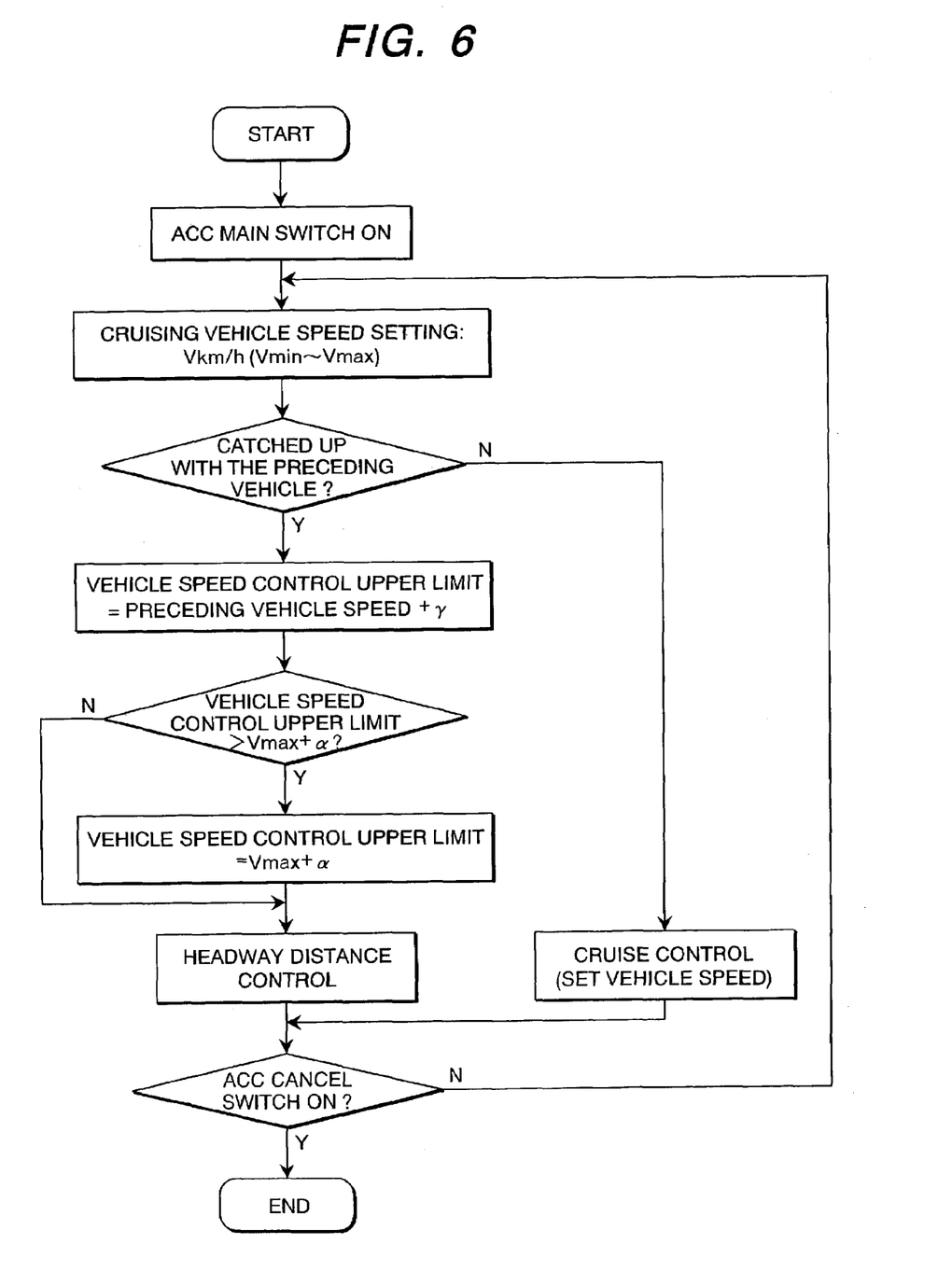
FIG. 6 is a control flowchart showing a further embodiment of the present invention.

FIG. 6 shows an example in which the upper-limit vehicle speed during headway distance control is greater than the speed of the preceding vehicle by a fixed speed. In this example, the response of the following vehicle also improves. However, since direct use of this method does not limit the fleet driving speed, a limiter is provided for the maximum vehicle control speed in this example.

Figure 7:
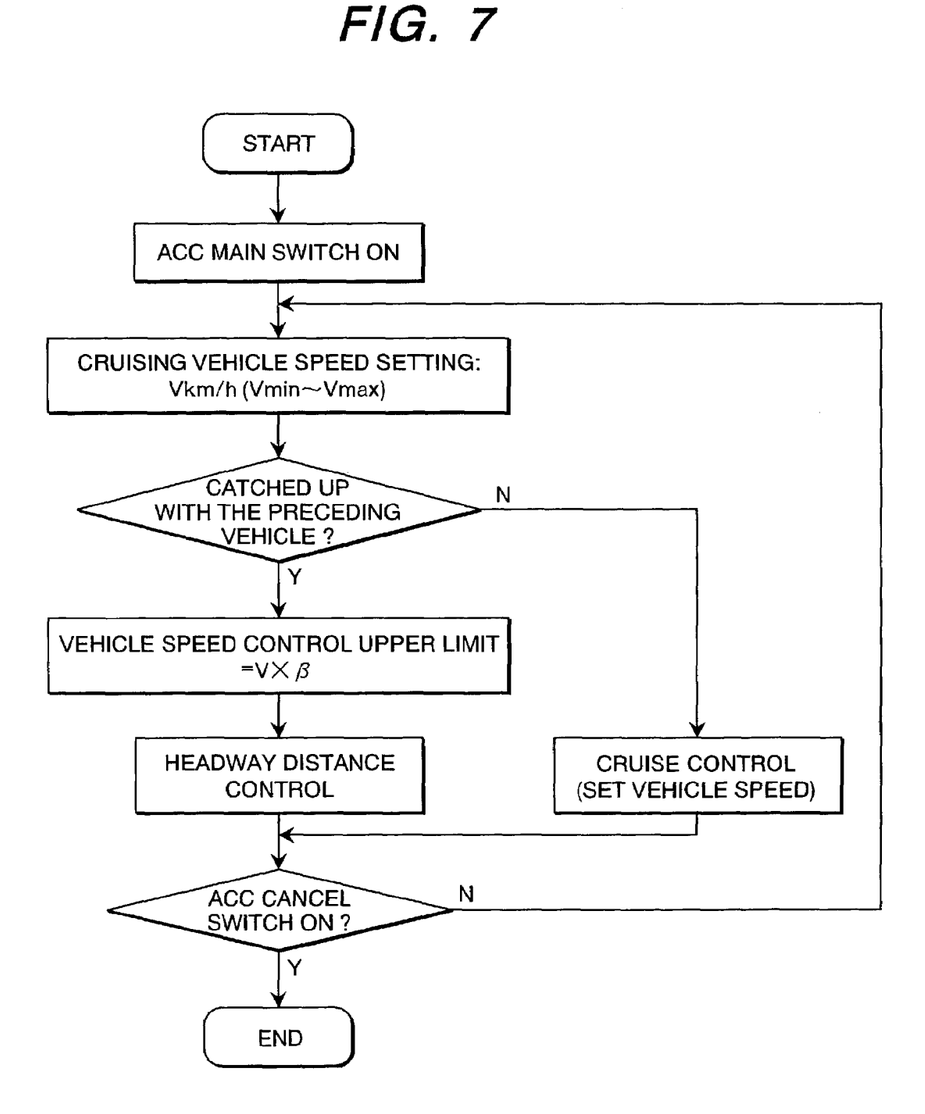
FIG. 7 is a control flowchart showing a further embodiment of the present invention.

FIG. 7 shows an example in which the upper-limit vehicle speed under headway distance control is increased by multiplying the set vehicle speed by a constant.

Figure 8:
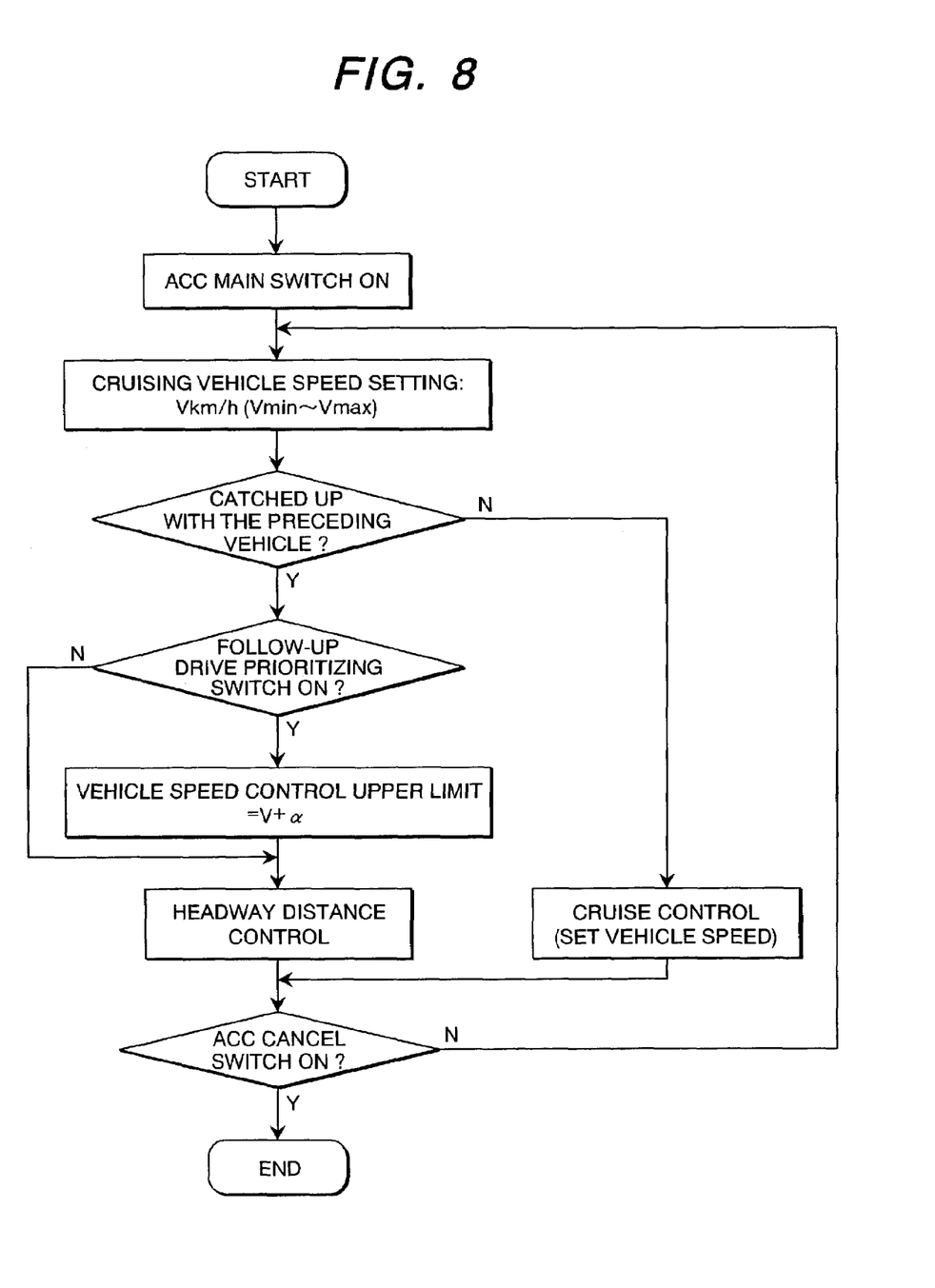
FIG. 8 is a control flowchart showing a further embodiment of the present invention.

FIG. 8 shows the example where the automatic vehicle speed control apparatus is provided with the follow-up drive prioritizing switch 15 by which, although conventional ACC mode is valid during the OFF status of the switch, an ACC mode that assigns priority to follow-up driving will be selected when the switch is set to the ON position. In this example, the switch does not always need to be provided downstream with respect to the ACC main switch, and can be, for example, a three-position switch provided on the same level as that of the ACC main switch, or may have an added function so that when the switch is set to ON, the upper limit of the vehicle speed will also be set automatically. In addition, the particular setting position of the follow-up drive prioritizing switch on the display device 10 can be displayed in a character/graphic format or may be displayed in a different display color.

Figure 9:
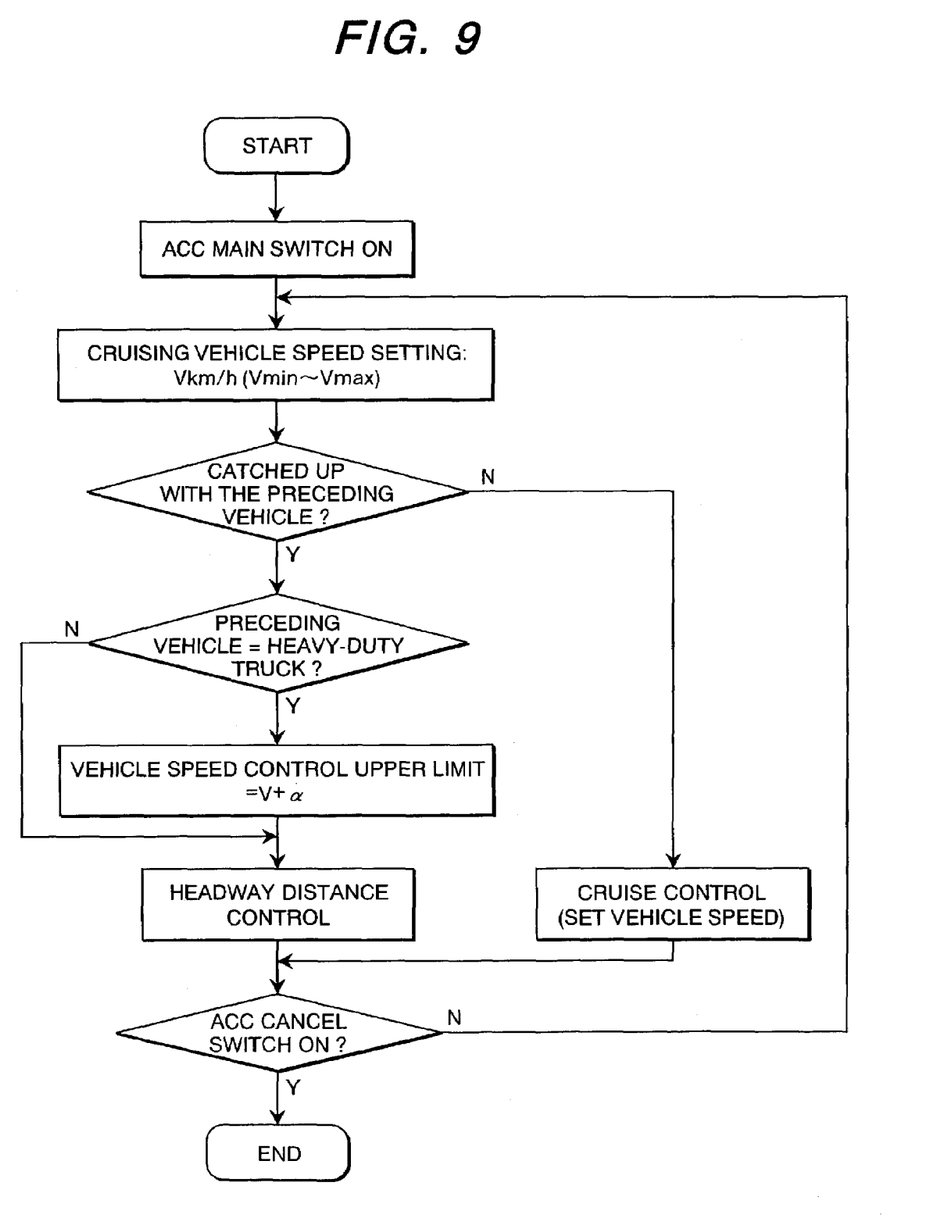
FIG. 9 is a control flowchart showing a further embodiment of the present invention.

FIG. 9 shows an example in which, when the preceding vehicle is a heavy-duty truck, fleet driving at the same set vehicle speed as the speed of the preceding vehicle is enabled by increasing the upper limit of the vehicle speeds existing during headway distance control, to a value greater than the previously set speed. Fleet driving in compliance with the maximum speed limit of 90 km/h applied to heavy-duty trucks can be reliably achieved by limiting the type of preceding vehicle to a heavy-duty truck.

A method that employs a vehicle-mounted camera, inter-vehicle communications, or the like, may be usable as a means of identifying heavy-duty trucks.

The value at which the legally specified "integrated permissible error" of the speedometer used in the vehicle can be absorbed is based on the following concept: the permissible errors of speedometer indications that are provided for in Article 46 of the Safety Standards are "within the range from +15 to −10 percent at speeds of 35 kilometers or more per hour on flat paved roads", and since this range is specified as the integrated permissible error range that covers all conditions such as the error of the instrument itself, the deflection of tires due to loading, wear on the tires, or the air pressures thereof, provided that irrespective of the vehicle type, the maximum ACC-settable vehicle speed is "V km/h", the symbols "α" and "β" shown in the flowchart take values of "0.25×V km/h or more" and "22/17 or more", respectively.

Of course, if the relevant law is amended, a concept similar to the above will be applied and "α" and "β" will correspondingly take the appropriate values. Also, as the values of "α" and "β" are increased, following vehicles will be more likely to follow the preceding vehicle if the driver thereof drives at a speed exceeding the set speed. It is desirable, therefore, that the vehicle speed be set to a value in the neighborhood of its lower limit.

In any case, provided that the leading vehicle runs in ACC mode at a cruising speed within the legal speed limits, the steady driving vehicle speed of the following vehicle does not exceed the upper limit of the legal speed limits, and hereby, fleet driving can be realized.

Since any changes or differences in vehicle speed between vehicles can be absorbed by increasing above the set vehicle speed the upper-limit value of the vehicle speed under the headway distance control conducted when the preceding vehicle is acquired using the ACC function, fleet driving at the same setting of the vehicle speed is possible and this, in turn, reduces the burdens of the drivers when they drive on expressways, and ensures highly efficient, smooth traffic flow.

Reference numerals attached to the drawings show the following parts. 1 . . . Radar device, 2 . . . Vehicle speed sensor, 3 . . . Vehicle controller, 4*a* . . . Main switch, 4*b* . . . Setting switch, 10 . . . Display device, 11 . . . Engine controller, 13 . . . Brake controller, 15 . . . Follow-up drive prioritizing switch.

What is claimed is:

1. An automatic vehicle speed control apparatus comprising:
    a vehicle speed detection unit for detecting a speed of an own vehicle;
    a headway distance detection unit for detecting a headway distance to a preceding vehicle; and
    a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist;
    wherein, if the set cruise speed is at an upper limit of a settable vehicle speed range, an upper limit speed of the own vehicle is set to a value greater than the set cruise speed when a preceding vehicle exists.

2. The automatic vehicle speed control apparatus according to claim 1, further comprising a switch for selecting whether the upper limit of the vehicle speed is to be increased above the set cruise speed or to be matched when a preceding vehicle exists.

3. An automatic vehicle speed control apparatus comprising:
    a vehicle speed detection unit for detecting a speed of an own vehicle;
    a headway distance detection unit for detecting a headway distance to a preceding vehicle; and
    a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist, wherein an upper limit speed of the own vehicle is set to a value greater than the set cruise speed when a preceding vehicle exists;
    wherein the upper limit of the vehicle is controlled to a fixed value greater than the upper limit of the settable vehicle cruise speed range by a fixed speed when a preceding vehicle exists.

4. The automatic vehicle speed control apparatus according to claim 3, wherein the fixed value is set to a value absorbable for a legally specified "integrated permissible error" of the speed meter used in the vehicle.

5. The automatic vehicle speed control apparatus according to claim 3, further comprising a switch for selecting whether the upper limit of the vehicle speed is to be increased above the set cruise speed or to be matched when a preceding vehicle exists.

6. An automatic vehicle speed control apparatus comprising:
    a vehicle speed detection unit for detecting a speed of an own vehicle;
    a headway distance detection unit for detecting a headway distance to a preceding vehicle; and
    a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist, wherein an upper limit speed of the own vehicle is set to a value greater than the set cruise speed when a preceding vehicle exists;
    wherein the upper limit of the vehicle is controlled to a value greater than the speed of the preceding vehicle by a fixed speed when a preceding vehicle exists.

7. The automatic vehicle speed control apparatus according to claim 6, wherein the fixed value is set to a value absorbable for a legally specified "integrated permissible error" of the speed meter used in the vehicle.

8. The automatic vehicle speed control apparatus according to claim 6, further comprising a switch for selecting whether the upper limit of the vehicle speed is to be increased above the set cruise speed or to be matched when a preceding vehicle exists.

9. An automatic vehicle speed control apparatus comprising:
    a vehicle speed detection unit for detecting a speed of an own vehicle;
    a headway distance detection unit for detecting a headway distance to a preceding vehicle; and
    a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist, wherein an upper limit speed of the own vehicle is set to a value greater than the set cruise speed when a preceding vehicle exists;
    wherein the upper limit of the vehicle is controlled to a value of the vehicle cruise speed by multiplying a constant greater than 1 when a preceding vehicle exists.

10. The automatic vehicle speed control apparatus according to claim 9, wherein the fixed value is set to a value absorbable for a legally specified "integrated permissible error" of the speed meter used in the vehicle.

11. The automatic vehicle speed control apparatus according to claim 9, further comprising a switch for selecting whether the upper limit of the vehicle speed is to be increased above the set cruise speed or to be matched when a preceding vehicle exists.

12. An automatic vehicle speed control apparatus comprising:
    a vehicle speed detection unit for detecting a speed of an own vehicle;

a headway distance detection unit for detecting a headway distance to a preceding vehicle; and a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist, wherein an upper limit speed of the own vehicle is set to a value greater than the set cruise speed when a preceding vehicle exists;

wherein the upper limit of the vehicle is controlled to a value of the speed of the preceding vehicle by multiplying a constant greater than 1 when a preceding vehicle exists.

13. The automatic vehicle speed control apparatus according to claim 12 further comprising a switch for selecting whether the upper limit of the vehicle speed is to be increased above the set cruise speed or to be matched when a preceding vehicle exists.

14. An automatic vehicle speed control apparatus comprising:

a vehicle speed detection unit for detecting a speed of an own vehicle;

a headway distance detection unit for detecting a headway distance to a preceding vehicle; and a vehicle control unit for controlling said own vehicle so as to maintain the headway distance detected by said headway distance detection unit at a set headway distance when a preceding vehicle exists, and for controlling said own vehicle so as to maintain the vehicle speed detected by said vehicle speed detection unit at a set cruise speed when no preceding vehicles exist, wherein an upper limit speed of the own vehicle is set to a value greater than the set cruise speed when a preceding vehicle exists;

wherein the upper limit of the vehicle is controlled to a value greater than the set cruise speed by a fixed speed when a preceding vehicle exists; and wherein the fixed value is set to a value absorbable for a legally specified "integrated permissible error" of the speed meter used in the vehicle.

15. The automatic vehicle speed control apparatus according to claim 14, further comprising a switch for selecting whether the upper limit of the vehicle speed is to be increased above the set cruise speed or to be matched when a preceding vehicle exists.

* * * * *